US010929485B1

(12) United States Patent
Chew et al.

(10) Patent No.: US 10,929,485 B1
(45) Date of Patent: Feb. 23, 2021

(54) BOT SEARCH AND DISPATCH ENGINE

(71) Applicant: Amazon Technologies, Inc., Seattle, WA (US)

(72) Inventors: Chee H. Chew, Bellevue, WA (US); Robert Yuji Haitani, Seattle, WA (US); Aneeb Naveed Qureshi, Seattle, WA (US); Jean Joseph Tavernier, Seattle, WA (US); Amber Autrey Taylor, Seattle, WA (US); Srikanth Thirumalai, Bellevue, WA (US); Cory William Toedebusch, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 483 days.

(21) Appl. No.: 15/247,737

(22) Filed: Aug. 25, 2016

(51) Int. Cl.
*G06N 20/00* (2019.01)
*G06F 16/9032* (2019.01)
*G06F 16/9038* (2019.01)
*G06F 16/9535* (2019.01)

(52) U.S. Cl.
CPC ...... *G06F 16/9535* (2019.01); *G06F 16/9038* (2019.01); *G06F 16/90332* (2019.01); *G06N 20/00* (2019.01)

(58) Field of Classification Search
CPC ......... G06F 17/30867; G06F 17/30976; G06F 17/30991; G06F 16/9535; G06F 16/9038; G06F 16/90332; G06N 99/005; G06N 20/00
USPC ...................................................... 707/706
See application file for complete search history.

(56) References Cited

U.S. PATENT DOCUMENTS

| 2004/0205772 | A1* | 10/2004 | Uszok | H04L 29/06 719/317 |
| 2009/0158278 | A1* | 6/2009 | De-Kay | H04L 67/2819 718/100 |
| 2012/0290950 | A1* | 11/2012 | Rapaport | H04N 21/8358 715/753 |

(Continued)

OTHER PUBLICATIONS

Ireland, Corydon. Alan Turing at 100. [online] Harvard Gazette, Sep. 13, 2012 [retrieved on Aug. 18, 2106]. Retrieved from the Internet: <URL: http://news.harvard.edu/gazette/story/2012/09/alan-turing-at-100/>.

(Continued)

*Primary Examiner* — Hosain T Alam
*Assistant Examiner* — Saba Ahmed
(74) *Attorney, Agent, or Firm* — Kilpatrick Townsend & Stockton LLP

(57) ABSTRACT

Techniques for improving access to and interactions with bots are described. In an example, a first bot, hosted on a computing system, may identify an action to be performed for a user associated with a computing device. The action may be identified based on a user interaction with the first bot, where the user interaction may be provided from the computing device. The first bot may select a second bot based on the action. The second bot may be hosted on a same or a different computing system. The first bot may determine, based on a previous user input to the first bot, a parameter value for an execution of the action and may send the parameter value to the second bot. In response, the first bot may receive a result of an execution of the action and may provide information about the result to the computing device.

22 Claims, 8 Drawing Sheets

(56) References Cited

U.S. PATENT DOCUMENTS

| | | | | |
|---|---|---|---|---|
| 2014/0279050 A1* | 9/2014 | Makar | ................... | G06N 20/00 |
| | | | | 705/14.66 |
| 2015/0066832 A1* | 3/2015 | Kulik | ................... | G06F 21/552 |
| | | | | 706/47 |
| 2015/0215365 A1* | 7/2015 | Shaffer | ................... | H04L 43/08 |
| | | | | 370/252 |
| 2016/0034305 A1* | 2/2016 | Shear | ................... | G06F 16/248 |
| | | | | 707/722 |
| 2016/0044380 A1* | 2/2016 | Barrett | ................ | H04N 21/812 |
| | | | | 725/53 |
| 2016/0306974 A1* | 10/2016 | Turgeman | ............. | G06F 3/0482 |

OTHER PUBLICATIONS

McFarland, Matt. What happened when a professor built a chatbot to be his teaching assistant. [online] Washington Post, May 11, 2016 [retrieved on Aug. 18, 2016] Retrieved from the Internet: <URL: https://www.washingtonpost.com/news/innovations/wp/2016/05/11/this-professor-stunned-his-students-when-he-revealed-the-secret-identity-of-his-teaching-assistant/>.

SmarterChild. [online]. Wikipedia, Jan. 6, 2016 [retrieved on Aug. 18, 2016]. Retrieved from the Internet: <URL: https://en.wikipedia.org/wiki/SmarterChild>.

Wagner, Kurt. Facebook's Virtual Assistant 'M' Is Super Smart. It's Also Probably a Human. [online]. Recode, Nov. 3, 2015 [retrieved on Aug. 18, 2016]. Retrieved from the Internet: <URL: http://www.recode.net/2015/11/3/11620286/facebooks-virtual-assistant-m-is-super-smart-its-also-probably-a-human>.

* cited by examiner

BOT SEARCH AND DISPATCH ENGINE

BACKGROUND

The concept of bots has been around since the 1950s, driven by Alan Turing who designed the Turing test to see if machines could be indistinguishable from a human. Nowadays, bots play a role in multiple services, such as customer service support, travel support, and even real-life interactions. Generally, a bot may be implemented as a set of computer instructions on computer hardware for conducting a conversation via auditory or textual methods, and may be referred to as a chatterbot, a chatbot, or an artificial conversational entity.

Typically, a bot is used in a one-to-one manner. A user needs to know what particular bot to use and needs to separately interact with that bot via a computing device. For example, if a user needs to book ground transportation and air travel, the user identifies two different bots and interacts with each separately and independently of the interaction with the other one. The user actively invokes a bot designed to book ground transportation and inputs all the parameters for that leg of the journey. Thereafter and independently of the ground transportation booking, the user actively invokes a bot designed to book air travel and inputs parameters anew, even though some of the parameters may be common across the journey.

In existing electronic platforms, identifying a bot is akin to how web sites were accessed in the early days of the Internet. In 1990, the first Internet search engine, Archie, launched. Archie was an FTP site that hosted an index of downloadable directory listings. Only the listings were available via Archie and not the full site contents due to size. For users with increasing Internet use, it was easier to bookmark. The users would share web site recommendations through word-of-mouth, email, or messaging, telling other users to bookmark a page for future reference. Likewise, an existing electronic platform may provide Archie-like capability but does not allow a user to search and/or access a bot.

Further, interacting with multiple bots is performed in a segregated manner within existing electronic platforms. A user interaction with one bot is performed separately and independently of the user interaction with another bot, even when the two bots are hosted within the same electronic platform. Likewise, and for the same bot, repeated user interactions are also performed separately and independently of each other.

BRIEF DESCRIPTION OF THE DRAWINGS

Various embodiments in accordance with the present disclosure will be described with reference to the drawings, in which.

DETAILED DESCRIPTION

Figure 1:
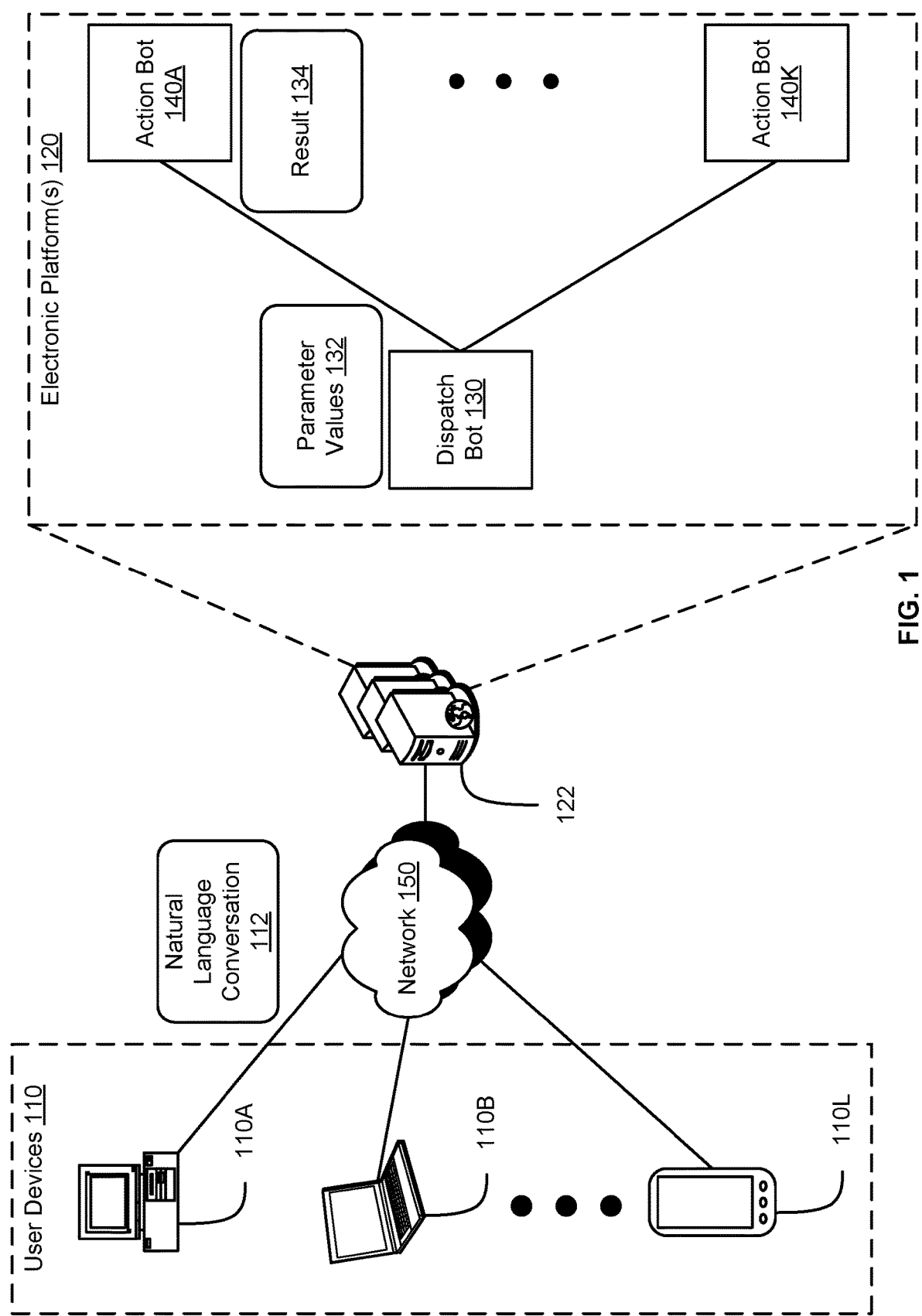
FIG. 1 illustrates an example computing environment for managing actions across multiple bots, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to, among other things, improving access to and interactions with bots. Specifically, a dispatch bot is described. The dispatch bot may represent a chatter bot configured to provide multiple functionalities. One example functionality includes search engine-like functionality, where the dispatch bot may identify one or more action bots suitable for performing an action for a user. Another example functionality of the dispatch bot includes interaction-related functionality, where the dispatch bot may act as an intermediary bot that facilitates the back-and-forth interactions between one or more action bots and one or more user devices.

An action bot may represent a chatter bot configured to perform an action. The action may represent a service, such as a computing service, that, upon execution by the action, bot generates a result, such as a conversation, a performed task, an initiation of an ongoing task, a recommendation, and/or other results. Executing the action may generally involve the action bot performing a function that corresponds to action based on values of parameters (referred to herein also as parameter values) defining an aspect of the action. An interaction may include user input about the action, such as a natural language input describing aspects of the action, and bot output about the action, such as a result of executing the action.

Generally, the dispatch bot may minimize user input of a user to select an action bot for a user and to facilitate the intermediated interaction between the user and the action bot. For example, the dispatch bot may provide the search engine and interaction functionalities based on a context of a user device, a user profile, a current conversation, and/or a history of conversations. The dispatch bot may use any available user-related data about the action to select a proper action bot, pass data about the action to the action bot, and pass the result of the action from the action bot to the user device. Further, some or all of the user-related data may be stored, maintained, and/or reused across multiple conversations with the user and other users. In addition, the dispatch bot may be multimodal enabling different types of user inputs such as textual, auditory, or graphical user inputs, and may be cross-platform enabling interactions with multiple action bots across multiple electronic platforms.

To illustrate, consider an example of a user making travel reservations. BoB, a bot of bots, is a dispatch bot that maintains a list of actions supported by various action bots, including Wheels bot and Wings bot. Wheels bot may be an action bot for booking ground transportation. Wings bot may be a bot for reserving airline tickets. BoB, Wheels bot, and Wings bot may be hosted within the same or at different electronic platforms. A user operating a computing device may access the electronic platform hosting BoB and may input a search query in a search field for travel to a destination city ("e.g., fly me to Seattle."). In response, BoB may initiate a natural language conversation with the user through the electronic platform and the user's computing device. BoB may confirm whether the ground transportation and an airline ticket are needed from the user's city (e.g., "do you need help getting a ride to JFK airport?"). If so, BoB identifies Wheels bot for ground transportation (e.g., a first action) and Wings bot for airline reservation (e.g., a second action) and determines parameters to initiate the respective actions. Certain parameters may be shared between the two actions, such as the number of travelers. Other parameters may be interdependent, such as the arrival time to the airport and the flight departure time. Yet other parameters may be independent of each other, such as whether a direct flight is preferred or not. Further, certain values of the parameters may be available from any of the user-related data such as a context of computing device, a user profile, the current conversation, and/or a history of conversations. Based on the parameters and the user-related data, BoB may minimize the natural language conversation with the user to efficiently and quickly complete the travel arrangements. For example, BoB may ask the user to confirm the known values (e.g., "last time, you had no companions, any changes this time?") and may solicit specific user input to the unknown values (e.g., "what time would you like to fly?"). BoB may send the applicable values to Wheels bot and Wings bot without having to ask the user to provide any unknown values to common parameters twice. Instead, BoB may solicit such values once and use the common values for both bots. Likewise, BoB may also observe the interdependencies between the parameters. For instance, the value for the arrival time to the airport may not be less than a threshold amount (e.g., two hours) relative to the value for the flight departure time. Once the ground transportation and the airline tickets are reserved, BoB may pass the respective confirmation numbers, times, receipt, and/other travel-related information to the user's computing device.

Hence, the dispatch bot, such as BoB, may provide numerous technical advantages. For example, similarly to how Internet search engines (past the first generation) benefited web site accesses, the dispatch bot would drastically improve search and accessibility to action bots. Further, the dispatch bot may not be limited to being a bot search engine. Instead, the dispatch bot may act as a single point for any user to utilize many action bots by using natural language input across different input modalities (e.g., texts, audio, graphics) and may simplify the interaction such that user need not worry, learn, or know what action bot to invoke and/or the intricacy of each action bot's interface. By simplifying the interactions (e.g., not requesting user input redundantly and reusing stored user-related data across multiple bots), computing efficiency (e.g., processing power and memory capacity) may be improved relative to existing systems.

FIG. 1 illustrates an example computing environment for managing actions across multiple bots. Specifically, the computing environment may include user devices 110 accessing an electronic platform 120 over a data network 150. The electronic platform 120 may be implemented on a computing system 122 of a service provider and may host a dispatch bot 130. The dispatch bot may be configured as a bot search and dispatch engine facilitating access of the user devices 110 to action bots 140A-140K. Some or all of the action bots 140A-140K may be hosted on the same electronic platform 120 or may be distributed across multiple electronic platforms communicatively coupled with the electronic platform 120 via one or more data networks. Hence, by operating a user device, a user may interact with the dispatch bot 130. In turn, the dispatch bot 130 may facilitate access to and action execution by the action bots 140A-140K, as proper, on behalf the user.

For example, the user may operate the user device to access the dispatch bot 130 over the data network 150. In turn, the dispatch bot 130 may facilitate a natural language conversation with the user via the user device to identify one or more actions that should be performed. For each of the actions, the dispatch bot 130 may select at least one of the action bots 140A-140K that supports the action and may identify the parameters that enable the selected action bot(s) to execute the action. Based on user-related data, the dispatch bot 130 may determine known values of the parameters and may identify that remaining values may be currently unknown. The user-related data may include data from any or a combination of a context of the user device, a user profile, the current natural language conversation, and/or a history of natural language conversations. For the known values, the dispatch bot 130 may solicit the user to confirm these values via additional natural language input (e.g., "yes or no," and changes associated with any "no"). For the unknown values and based on commonalities between parameters and dependencies between executing multiple actions, the dispatch bot 130 may solicit the user to provide additional natural language input specific to the unknown values (e.g., "tell me what time you would like to fly"). The parameters may be populated based on the values and sent to the selected action bot(s), thereby triggering the selected action bot(s) to execute the action(s). The dispatch bot 130 may receive a result of an action execution from an action bot and may provide information about the result to the user device for presentation to the user according to a natural language format.

In an example, the user devices 110 may represent a set of computing devices, each suitable for communication with the computing system 122 to access the dispatch bot 130 over the data network 150. For example, the client device 110A may be a desktop computer, client device 110B, a laptop, client device 110L, a smartphone or a tablet. Of course, other types of end computing devices may be possible. Further, each user device may be associated with a user identifier that may uniquely identify the respective user. For example, the user identifier may include a username of the user and/or an internet protocol (IP) address or media access control (MAC) address of the user device. The user identifier may be registered with the electronic platform 120, the dispatch bot 130, and/or some or all of the action bots 140A-140K. The registration may enable the dispatch bot 130 and/or the action bots 140A-140K to identify the user and execute actions for the user.

In an example, the electronic platform 120 may represent a platform that may host a number of computing services, such as one for facilitating data storage, hosting virtual machines, and/or even supporting an electronic marketplace. Such computing services may also include hosting the dispatch bot 130 and some or all of the action bots 140A-

140K. Generally, the electronic platform 120 may be managed by a service provider of the computing services and may be hosted on the computing system 122. The computing system 122 may represent hardware and/or software systems suitable to provide the computing services of the electronic platform 120 and to communicate with the user devices 110 and with computing systems of other electronic platforms via data networks. For example, the computing system 122 may include dedicated computing hardware and/or computing software hosted within a data center (e.g., a cloud-based computing service).

In an example, the data network 150 may represent a communications network suitable for data exchange. For example, the data network 150 may include a public network (e.g., the Internet) or a private network (e.g., an intranet), may be wired or wireless, and may support different communication protocols.

As illustrated, the dispatch bot 130 may support different types of user devices 110. Accordingly, interactions with users may involve virtually any type of computing device. Further, the dispatch bot 130 may support multimodal interactions. Within a same user device or across multiple user devices, a user or multiple users may interact with the dispatch bot 130 via text, audio, graphics (images, emoticons, etc.). A user interaction may include natural language input from a user and natural language output from the dispatch bot 130 across any or a combination of the input and output modalities.

Further, the dispatch bot 130 may support multiple actions across multiple electronic platforms. More particularly, through the interaction with a user, the dispatch bot 130 may identify the needed actions. If multiple action bots are compatible, even when hosted on different electronic platforms, the dispatch bot 130 may act as an intermediary between the user and these action bots.

Interactions of the user with the dispatch bot 130 for the different actions may be stored as part of the user-related data. Future interactions may be minimized by deriving parameter values from the stored user-related data, thereby improving the efficiency of these interactions. Any parameter value used for one action bot may be reused for another action bot as applicable without having to re-solicit user input specific to that value.

To illustrate, consider an example of a user of the user device 110A. Similar examples may also apply to any other users of the client devices 110. The user may access the dispatch bot 130 over the network 150 via the user device 110A. The dispatch bot 130 may manage a natural language conversation 112 with the user. During the conversation and as needed (e.g., when the data is unavailable to the dispatch bot 130), the dispatch bot 130 may solicit the user about a desired action. The dispatch bot 130 may identify that the action bot 140A supports the desired action and may manage the interaction between the user the action bot 140A to initiate the action. For instance, the dispatch bot 130 may collect any unknown parameter values through the natural language conversation 112. Already known parameter values (e.g., ones from a previous interaction performed on behalf of the user with the action bot 140K) may be derived from the user-related data. The dispatch bot 130 may pass these values as a set of parameter values 132 to the action bot 140A, in addition to the user identifier of the user. In turn, the action bot 140A may execute or initiate an execution of the action 140A and may return a result 134 to the dispatch bot 130. Through the natural language conversation 112, the dispatch bot 130 may inform the user about the result 134. If an additional action should be performed, within the same natural language conversation 112 or a subsequent conversation, the dispatch bot 130 may similarly manage the user interaction to dispatch the action to an appropriate action bot and to inform the user about the result. Of importance, user-related data from one conversation to the next or within the same conversation may be reused for different actions or for repeated actions without having to solicit the relevant user input anew.

Figure 2:
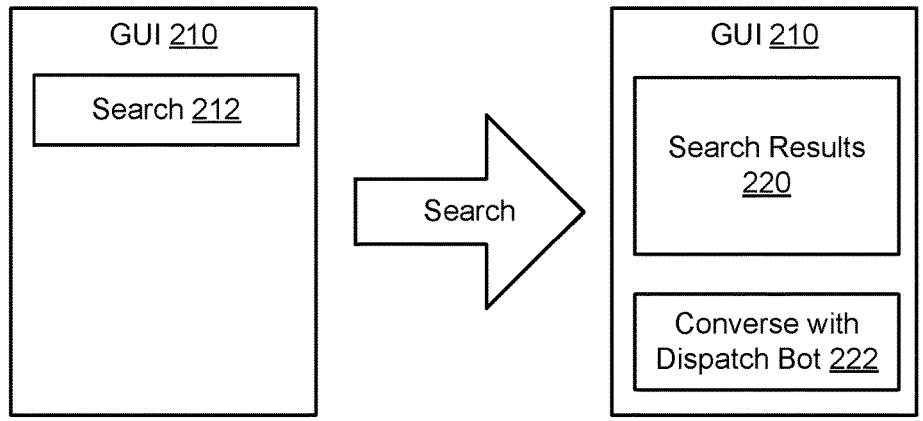
FIG. 2 illustrates an example user interface of a user device for interacting with a dispatch bot hosted on an electronic platform, according to an embodiment of the present disclosure.
Figure 2:
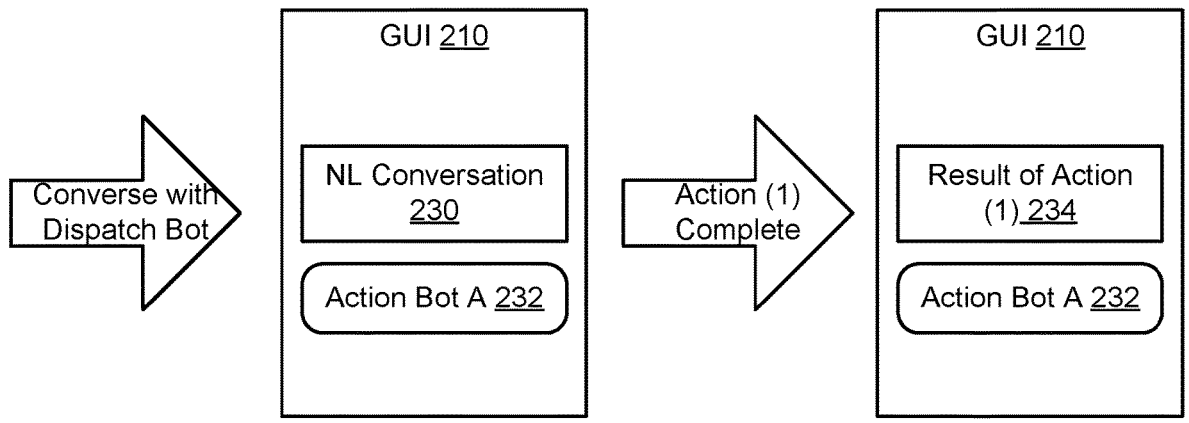
Figure 2:
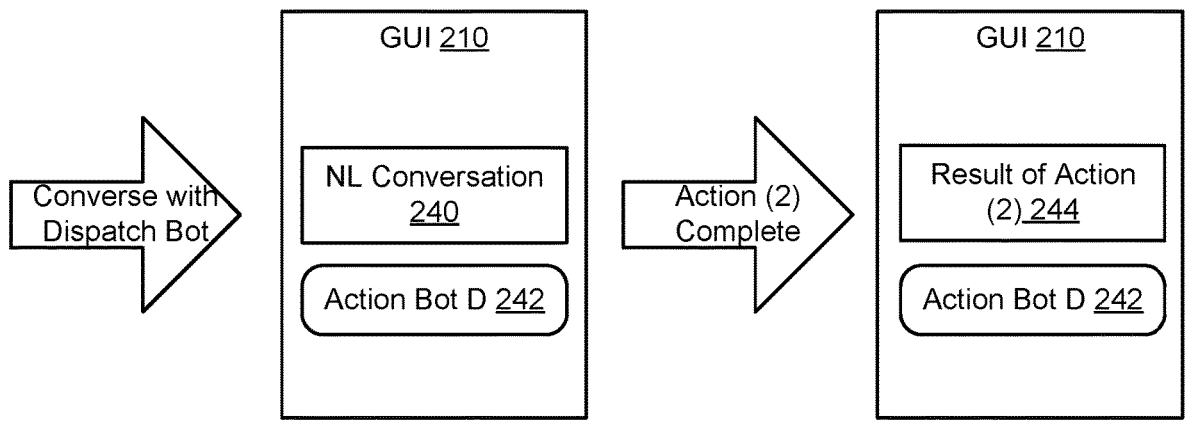

FIG. 2 illustrates an example user interface of a user device for interacting with a dispatch bot hosted on an electronic platform. As illustrated, the user interface may include a graphical user interface (GUI) 210 for text and/or graphics modalities. However, the user interface may support other modalities, such as audio, by including appropriate input/output (I/O) components, such as a microphone and a speaker along with a suitable software application. The GUI 210 (and more generally the user interface) may provide access to an application hosted on the user device, such as a web browser or a dedicated application (referred to herein as a "bot application") available from an application store of a service provider. The application may interact with the dispatch bot over an interface, such as over a web interface or an application program interface (API) interface.

A user may operate the user device to run the application and access the GUI 210. Through the GUI 210, the user may engage in natural language conversation with the dispatch bot to trigger actions. The dispatch bot may manage the natural language conversation and the selection of the actions bots for executing the actions. Hence, the user need not identify which action bot is desired. Instead, the user may describe the type of action and/or any needed parameter values. Further, in certain situations and depending on the configuration of the dispatch bot, the dispatch bot may not identify the selected action bot(s) to the user. Hence, the user may not be even aware of what action bot(s) are executing the action.

Initially, the GUI 210 may present a search field 212, similar to a typical search engine search field (Internet and otherwise). The user may input a user search in the search field (e.g., "travel to Seattle"). The electronic platform may provide search results 220. A portion or all of the search results 220 may be presented at the GUI 210. In conjunction, the GUI 210 may present an option 222 to converse with the dispatch bot. For example, the option 222 may be presented as a soft button with an icon or a recommendation within a recommendation toolbar that identifies dispatch bot. Upon a selection of the option 222 by the user through the GUI 210, the dispatch bot may initiate the natural language conversation with the user.

The option 222 may represent one ingress for invoking the dispatch bot. Other ingress types may be possible, some of which may not rely or depend on the search field 212. For instance, a dedicated soft button within a space of the GUI 210 or a hard button on the user device may be available to invoke the dispatch bot. In another example, a toolbar or a taskbar of the user device may be configured to invoke the dispatch bot. In yet another example, the user device may run the bot application in the background. The bot application may monitor user input through any of the modalities. Based on the user explicitly requesting the dispatch bot or on user input indicating an implicit request, the bot application may invoke the dispatch bot.

Once invoked, the dispatch bot may manage the natural language conversation with the user. The natural language conversation need not be linear. Instead, the user may at any time switch between topics of the conversation and/or pivot back to update a previous statement made during the conversation. The dispatch bot may dynamically update parameter values applicable to an action based on such updates without having to restart any specific conversation about that action anew.

For example, the user may identify a need for travel arrangement. The dispatch bot may determine that such an action may be a composite action composed of multiple other actions, such as ground transportation and airline reservation. The dispatch bot may collect any currently unavailable parameter values from the user through the natural language conversation. As illustrated in FIG. 2, the collection may be sequential, where the dispatch bot may solicit the user input for the ground transportation and, sequentially and as needed for non-overlapping parameter values, the airline reservation (or vice versa). However, the collection may be instead or additionally an aggregate collection, where the dispatch bot may solicit the user input jointly for the ground transportation and airline reservation. In both example, Collecting the parameter values may observe the commonalities between the parameters and dependencies between the actions.

As illustrated in FIG. 2, atone point of the conversation, the dispatch bot may solicit the user input for the ground transportation. For instance, the user and dispatch bot may engage in a natural language conversation 230 via messaging supported on the GUI 210. The dispatch bot may ask the user to provide unknown values for the ground transportation, such as a desired size of a ground vehicle and a desired arrival time to the airport. The user may respond with such information. The dispatch bot may accordingly pass the information to an action bot "A" 232 suitable to book the ground transportation. Upon an execution of the action, the action bot "A" 232 may book the ground transportation and provide a result 234 to the dispatch bot. The GUI 210 may be accordingly updated to present information about the result 234, such as by providing a receipt of the booking along with information about the ground transportation.

In this example, the dispatch bot need not but may identify the action bot "A" 232 to the user via the GUI 210. Whether to identify an action bot or not may depend on a set of rules, implemented within the dispatch bot. For instance, the set of rules may specify that anytime executing the action includes a transaction for value (e.g., payment), the dispatch bot should identify the action bot to the user. In another illustration, the set of rules may specify that if multiple action bots are available but the number does not exceed a threshold number (e.g., not more than two), the available action bots should be identified to the user with an option to the user for selecting one of these bots. However, if the number exceeds the threshold number or if the user has indicated a previous preference, the set of rules may not trigger the identification of the action bot(s).

As further illustrated in FIG. 2, at another point in the conversation, the dispatch bot may solicit the user input for the flight reservation. For example, the dispatch bot and the user may continue the natural language conversation. FIG. 2 illustrates this conversation point as natural language conversation 240 provided through the GUI 210. The dispatch bot may reuse any parameter values available from the conversation 230 about the ground transportation and applicable to the flight reservation. For instance, the dispatch bot may not ask the user about the desired departure time because the dispatch bot already has knowledge about the arrival time of the user to the airport. Other currently unknown parameter values may be solicited during the conversation 240, such as whether a direct flight is desired.

The user may respond with such information. The dispatch bot may accordingly pass the applicable parameter values to an action bot "D" 242 suitable to reserve a flight. Upon an execution of the action, the action bot "D" 242 may book an airline ticket and provide a result 244 to the dispatch bot. The GUI 210 may be accordingly updated to present information about the result 244, such as by providing a copy of an airline ticket. Here again, the dispatch bot may, but need not, identify the action bot "D" 242 to the user during the conversation 240.

Further, during the conversation 240, the user may request a change to the departure time (e.g., by moving it ahead of the arrival time to the airport or delaying it to significantly later), thereby impacting the ground transportation. Likewise, the user may request a change to the ground transportation during the conversation 240 about the flight reservation. In both cases, rather than restarting the conversation 230 anew to update the ground transportation booking, the dispatch bot may automatically update the parameter values applicable to that booking, ask the user for confirmation, update the action bot "A" 232, and present an update to the result 234.

Upon an execution of an action by an action bot, the result of the execution may span a period of time. For example, the ground transportation booking may include deploying a ground vehicle to the user's location. The result may show where the ground vehicle is relative to the user's location. In such situations, the dispatch bot may monitor and receive status updates about the result, such as about the relative locations of the ground vehicle and user. In an example, the GUI 210 may present such status updates within the same window presenting the result (e.g., the window for result 234 for the ground transportation). In another example, the GUI 210 may present such status updates separately from this window. For instance, a new pop-up window may be presented or a notification may be provided within a notification bar.

Further, at any point during the natural language conversation, an egress may be used to shift the conversation or disengage the dispatch bot. For example, in response to the user asking to cancel or stop the discussion about the ground transportation, the dispatch bot may exit the conversation 230 and shift to the conversation 240 about the flight reservation. In another example, the user's request need not be explicit. Instead, if the dispatch bot senses a frustration of the user during the conversation 230, the dispatch bot may imply such a request an automatically change the conversation 230 to the conversation 240 or may terminate both conversations altogether. The frustration may be sensed from the natural language input of the user (e.g., depending on specific terms or words) or from a number of unsuccessful attempts to collect information for or initiate an action (e.g., when this number exceeds a threshold number such as three times). In yet another example, once both actions are complete, the dispatch bot may ask the user if other actions are needed and, if none, may terminate the natural language conversation.

Figure 3:
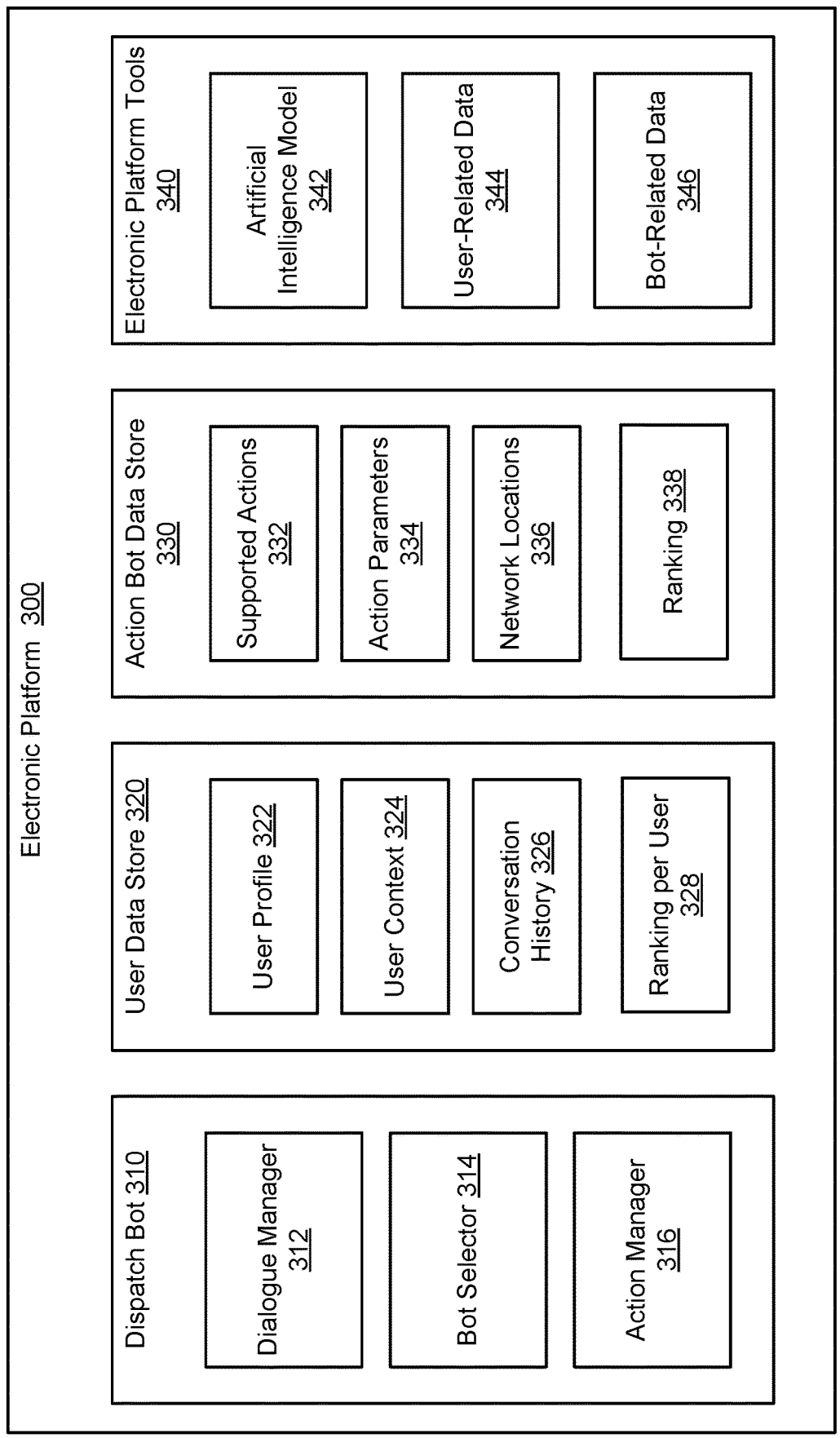
FIG. 3 illustrates example computing modules within an electronic platform to support a dispatch bot, according to an embodiment of the present disclosure.

FIG. 3 illustrates example computing modules within an electronic platform 300 to support a dispatch bot 310. A computing module may represent a set of computing hardware and/or software implemented to provide a specific set of functionalities. As illustrated, the electronic platform 300 may host the dispatch bot 310, along with other tools such as a user data store 320, an action bot data store 330, and electronic platform tools 340. In turn, each of these tools may include a set of modules. Although shown as being separate tools having separate modules, some or all of these tools and/or some or all of the modules may be integrated to form specific configurations of the dispatch bot 310.

In an example, the dispatch bot 310 may include a dialogue manager 312, a bot selector 314, and an action manager 316. The dialogue manager 312 may be configured to manage user interactions, such as natural language conversations with users. For instance, the dialogue manager 312 may implement natural language parsing to parse natural language input and a speech synthesizer to form natural language output. The dialogue manager 312 may interface with an artificial intelligence model 342 of the electronic platform tools 340 to enable aspects of the natural language conversation.

In an example, the dispatch bot 310 may be configured to have a personality. The personality may define various traits of the dispatch bot 310, including traits usable to interact with end users. An example trait may include a tone for conversing with the user, a method of conversing (e.g., the way questions are asked and information are solicited from the end user, etc.). Various techniques may be used to define the personality. One example technique may involve the artificial intelligence model 342. Specifically, the artificial intelligence model 342 may be trained to generate the traits that most effectively drive the conversation and result in highest success rate of utilizing the action bots. Another example technique may include training the artificial intelligence model 342 to also account for characteristics of the end user. In this example technique, the personality of the dispatch bot 310 may be adapted to one or more characteristics of the end user, some of which may be available from a respective user profile (e.g., gender, age group, etc.). In both example techniques, certain personality traits of the dispatch bot 310 may be avoided. For instance, the training data of the artificial intelligence model 342 and/or constraints may be imposed to eliminate offensive traits. The dialogue manager 312 may interact with the user based on the personality of the dispatch bot 310. For instance, a particular tone and a particular way of soliciting information may be used for the natural language conversations.

The bot selector 314 may be configured to select one or more action bots for execution of one or more actions for a user in response to associated user interactions. For instance, the bot selector 314 may match, predict, and/or recommend an action bot based on a current and/or previous natural language conversation with the user or other users and based on other user-related data. In an example, the bot selector 314 may interface with the user data store 320 and/or the artificial intelligence model 342 to perform the selection.

The action manager 316 may be configured to manage how one or more actions may be executed by one or more action bots for a user in response to associated user interactions. For instance, the action manager 316 may generate structured data from a current and/or previous natural language conversation with the user or other users and based on other user-related data. The data structure may include values for parameters specific to an action. The data structure may be sent to an applicable action bot to trigger the execution of the action. Result(s) and status updates may be received back by the action manager 316 and passed to the dialogue manager 312 for presentation to the user. In an example, the action manager 316 may interface with the user data store 320, the action bot data store 330, and/or the artificial intelligence model 342 to manage the action.

In an example, the user data store 320 may store user-related data per user across a user base and may represent a database or some other storage structure of the data. The user-related data may facilitate dialogues, selections of action bots, and/or managements of actions. For instance, the user-related data across the user base may be used to train the artificial intelligence model 342. In another illustration, the parsing of natural language input of a user or the synthesizing of natural language input for the user may use slot filling and expressions depending on successes and failures of past natural language conversations and actions for the user as maintained in the user-related data specific to the user. In yet another illustration, user-related data of other users may be used to recommend an action bot for a current use given the user-related data specific to the current user. Generally, the user-related data may be organized per user in a user profile 322, a user context 324, a conversation history 326, and a ranking 328 per user.

The user profile 322 may store information about a user, such as a username, preferences for actions and action bots, past selections of action bots, past natural language utterances, past structured data, frustrations with utilizing specific action bots, frequencies of utilization of specific action bots, and/or other user-specific data associated with actions and/or action bots.

The user context 324 may store information about contexts of engaging in conversations. Some of the contexts may be derived from the actual conversations (such as, where the user says "I am in New York," a context location may be derived). Other contexts may be derived from the user device (such as the context location of the user device, type of device, supported I/O modalities and other device-based contexts).

The conversation history 326 may store information about past user interactions, such as past natural language conversations. The sequence of such conversations may also be stored (e.g., two days ago, conversation "A" occurred; one day ago, conversation "B" occurred, and so on and so forth). Further, within a current conversation, previous natural language utterances may be stored and may be considered as part of the conversation's history. Storing such utterances may allow a non-linear conversation to occur, where the user may pivot back to update previously made statements made at any point in time during the conversation.

The ranking 328 per user may rank the action bots for user. This ranking 328 may indicate a preference of the user associated with utilizing an action bot. Generally, the higher the ranking, the more preferred the action bot may be. Some of the user-related data for a user may be used for the ranking 328, such as the frequency of utilizations and the measured frustrations.

Hence, any or a combination of the user-related data stored in the user profile 322, user context 324, the conversation history 326, and/or the ranking 328 may be used to manage a dialogue, filter a selection of an action bot, or manage an action and a result thereof. For instance, speech selection for presentation to a user may be made based on the user profile 322. An action bot may be selected over another action bot based on the rankings 328 of the two action bots relative to the user. Similarly, slot filling based on the user context 324 and conversation history 326 may be used to populate parameters values of an action.

In an example, the action bot data store 330 may store bot-related data and may represent a database or some other storage structure of the data. The bot-related data may describe action bots, actions supported by the action bots, and parameters defining the actions. Such data may also facilitate dialogues, selections of action bots, and/or managements of actions. Generally, the bot-related data may be organized per action bot in a list of supported actions 332, a list of action parameters 334, identifiers of network locations 336, and ranking 338 against other action bots.

The list of supported actions 332 may identify what actions each action bot may support and a classification of such actions into categories of computing services (e.g., for travel booking, for customer service support, etc.). In comparison, the list of action parameters 334 may identify the parameters each action may necessitate and acceptable ranges and types of values for the parameters. The descriptions of the actions and parameters may be published from an electronic platform that may host the action bot, may be available from a web interface or API of the action bot, or may be stored in metadata associated with the action.

The identifiers of the network locations 336 may identify addresses within electronic platform where the action bots may be hosted. These identifiers may also describe the type of interface, such as a web interface and/or an API, that each action bot may support.

The ranking 338 may rank the action bots against each other across a user base. The ranking may be per classification of action and/or action and may reflect how well an action bot may be expected to perform an action. Generally, the higher the ranking, the better performing the action bot may be. Some of the user-related data across the user base may be used for the ranking 338, such as the measured success rate, failure rate, and/or frustration rate.

Hence, any or a combination of the bot-related data stored in the list of supported actions 332, list of action parameters 334, identifiers of network locations 336, and/or ranking 338 may be used to manage a dialogue, filter a selection of an action bot, or manage an action and a result thereof. For instance, speech selection for presentation to a user may be made based on the description of the supported actions 334 and action parameters 334. An action bot may be selected over another action bot based on the rankings 338 of the two action bots relative to an action. Similarly, structured data and interface calls may be based on the identifiers of the network locations 336.

In an example, the electronic platform tools 340 may store other tools configured to facilitate the functionalities of the dispatch bot 310 and/or to collect and maintain the user data store 320 and action bot data store 330. More particularly, by offloading some functionalities to the electronic platform tools 340, operations of the dispatch bot 310 may be improved (e.g., may reduce the processing power and memory capacity needed to host and run the dispatch bot 310 and may increase the responsiveness of the dispatch bot 310). The artificial intelligence model 342 may be an example of such tools 340. Additionally, the electronic platform tools 340 may store or have access to user-related data 344 and bot-related data 346 to train the artificial intelligence model 342.

The artificial intelligence model 342 may represent a computing module configured to provide artificial intelligence for enabling management of dialogue, action bot selection, and/or an action and a result thereof. For instance, the artificial intelligence model 342 may implement a machine learning algorithm for classifying action bots. The bot-related data 346 may be used to train the machine learning algorithm and may include some or all of the data available from the action bot data store 330. Generally, the bot-related data of an action bot may be any data relating to actions, parameters, values, sequence of actions, parameters, or values, structured data, and/or any user-related data that may have led to a successful result and/or a failure associated with invoking, utilizing, and/or tracking execution status from the action bot. The collection and use of the data, including for training purposes, may be limited to what a developer of the action bot may allow. The artificial intelligence model 342 may also implement one or more artificial neural networks to parse and recognize natural language input, generate natural language output to solicit user input, select an action bot, and generate structured data from the natural language input. In addition to the bot-related data 346, the user-related data 344 may be used to train the artificial neural network(s) and may include some or all of the data available from the user data store 320.

To illustrate, a user may interface with the dispatch bot 310 via a computing device. The user may provide a natural language input (e.g., "help me plan my trip"). In turn, the dispatch bot 310 may invoke the artificial intelligence model 342 to identify that the user needs ground transportation and flight reservation. The dispatch bot 310 may identify candidate bots that support these two actions from the list of supported actions 332. The dispatch bot 310 may apply filters to select a first action bot for the ground transportation booking and a second action bot for the travel reservation. The filters may be based on the user profile 322, the user context 324, conversation history 326, ranking 328 of the action bots for the user, and/or raking 338 of the action bots against each other. For each of these two action bots, the dispatch bot may identify the parameters for the respective action from the list of action parameters 334 and may determine whether values for these parameters may be available from the user data store 320. For unknown values, the artificial intelligence model 342 may be invoked to generate a set of questions to ask the user. The dispatch bot 310 may converse with the user based on the set of questions. The user responses may be parsed and passed to the artificial intelligence model 342 that may, in turn, update the set of questions (and, thus, the conversation) and/or identify parameter values. Once the values are identified, structured data may be generated. The dispatch bot 310 may send the structured data via an API call and/or web interface call to the selected action bots based on the identifiers of the network locations 336. Results may be received back. The artificial intelligence model 342 may be used again to generate conversation about the results. The dispatch bot may accordingly converse with the user to present the results.

Figure 4:
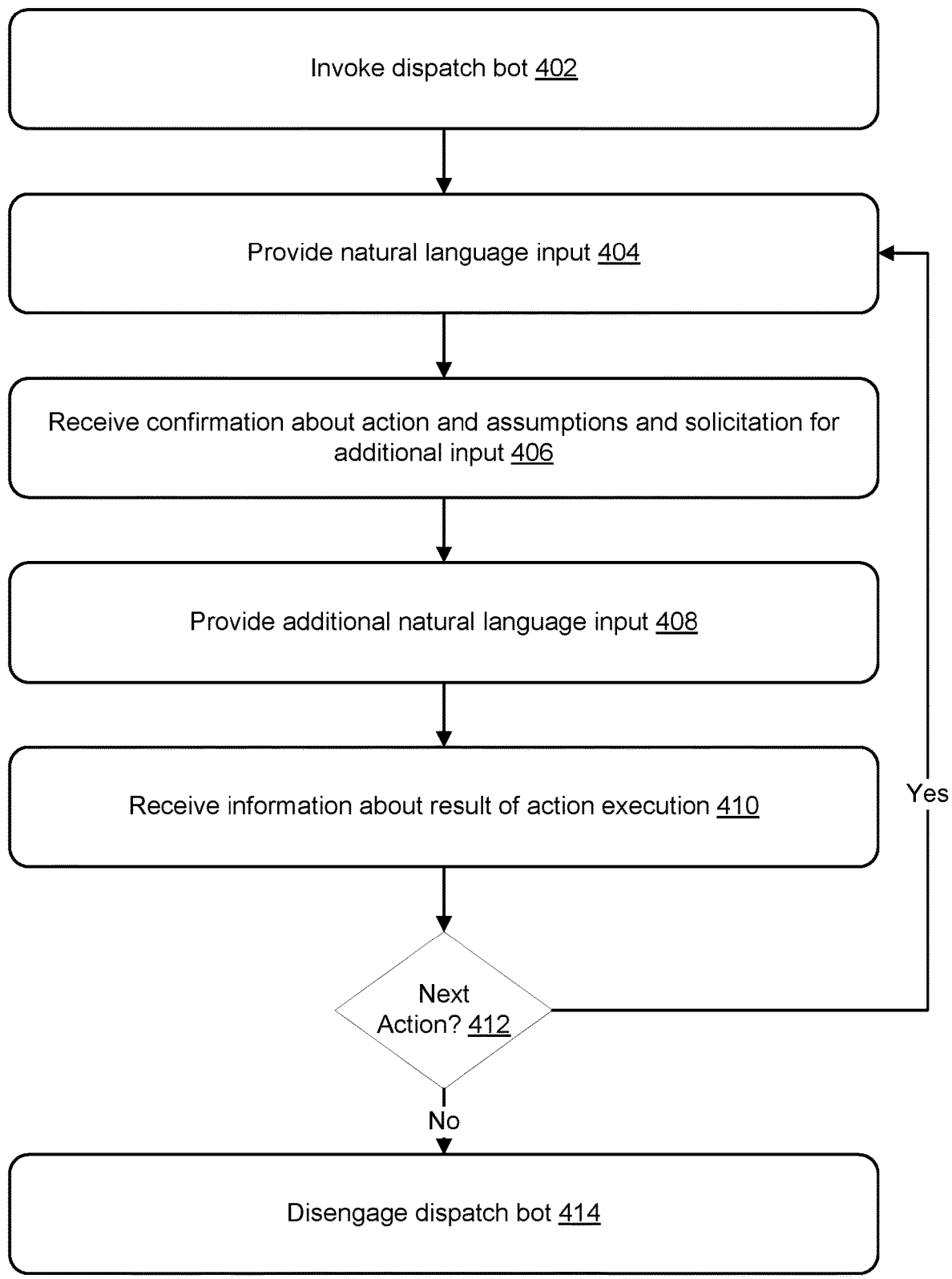
FIG. 4 illustrates an example flow for interfacing with a dispatch bot, according to an embodiment of the present disclosure.

FIG. 4 illustrates an example flow for interfacing with a dispatch bot. Some or all of the operations of the example flow may be embodied in, and fully or partially automated by, computing modules executed by one or more processors hosted on a user device of a user. While the operations are illustrated in a particular order, it should be understood that no particular order is necessary and that one or more operations may be omitted, skipped, and/or reordered.

The example flow of FIG. 4 may start at operation 402, where the user device may invoke the dispatch bot. Various types of ingress may be used, some of which may facilitate an explicit request of the user for the dispatch bot while other ones may facilitate an implicit request. For instance, and as illustrated in FIG. 2, an option to converse with the dispatch bot may be presented at a GUI. A selection of the option may invoke the dispatch bot.

At operation 404, the user device may provide natural language input (e.g., "help me plan my trip") to the dispatch bot. For example, the natural language input may be received via a user interface (e.g., the GUI) of the user device and may include text, audio, and/or graphics describing aspects of an action without necessarily identifying a specific action bot. The received input may be transmitted to the dispatch bot via an interface, such as a web interface or API, over a data network.

At operation 406, the user device may receive a confirmation about the action, in addition to assumptions about the known parameter values for the actions and solicitation for additional user input about unknown parameter values. For example, this information may be received back from the dispatch bot in response to the natural language input provided at operation 404 and may be presented in a natural language format to the user. The confirmation may inform the user about the requested action (e.g., "I will help you book ground transportation"). The assumptions may ask the user to confirm any of the known parameter values or make any updates (e.g. "last time, you booked this type of ground vehicle. I will do the same this time unless you tell me otherwise"). The solicitation may request the user to define the unknown parameters via natural language input (e.g., "tell me what time you would like to get to the airport").

At operation 408, the user device may provide the additional natural language input. For example, in response to the information presented to the user at operation 406, the additional natural language input may be received via the user interface and may but need not be same input modality as what was used at operation 404 (for instance if text was used at operation 404, audio may be used at operation 408). The received input (e.g., "get me there at 8:00 am") may be transmitted to the dispatch bot via the interface over the data network.

At operation 410, the user device may receive information about a result of an execution of an action. For example, the result may be received back from the dispatch in response to the input provided at operation 408 and may identify various aspects of the execution (e.g. "I booked you a car model 'A,' license plate '123.' It should arrive to your house by 7:30 am"). The execution may be performed by an action bot, which was selected by the dispatch bot based on the input provided at operation 404. The received information may identify the action bot (e.g., "the booking was done via company "XYZ") based on a set of rules specifying when this identification should be made. Further, the received information may span a period of time and may include status updates about the action (e.g., any progress of the result triggered by the execution of the action, such as "the car is ten minutes away from your house"). The received information may be presented to the user in a natural language format.

At operation 412, a determination may be made whether a next action should be executed. Various techniques may be used to make this determination. In one example technique, the user may explicitly request the next action via the natural language conversation with the dispatch bot. In another example technique, if there is no explicit user request, the dispatch bot may ask if the user would like to initiate the next action and/or may recommend the next action to the user. In yet another example technique, the natural language input at operation 404 may identify a composite action composed of multiple actions. The next action may be one of the multiple actions and its execution may, but need not, depend on the execution of the previous action. In all these example techniques, if a next action should be executed, operation 404 may be performed again such that operations 404-412 may provide a loop until no next action is determined. Through the loop, commonalties across the parameter values of the actions may be used to minimize the natural language conversation and avoid soliciting the user for redundant information. Although the example flow of FIG. 4 illustrates sequential identification of actions, collection of parameter values, and presentation of results, these different aspects of the interactions with the user may be performed in an aggregate manner.

At operation 414, no next action remains to be executed. Hence, the user device may disengage the dispatch bot. For example, natural language input of the user or some other user interaction (e.g., a user click on the option to converse with the dispatch bot) may explicitly or implicitly request the disengagement. Other types of an egress (e.g., sensed user frustration or a number of unsuccessful attempts to collect sufficient information and dispatch an action to an action bot) may be similarly used to disengage the dispatch bot and/or to shift the natural language conversation from one action to another action. The dispatch bot may enter an idle state, through which user interactions may be monitored to determine if the dispatch bot is invoked again.

Figure 5:
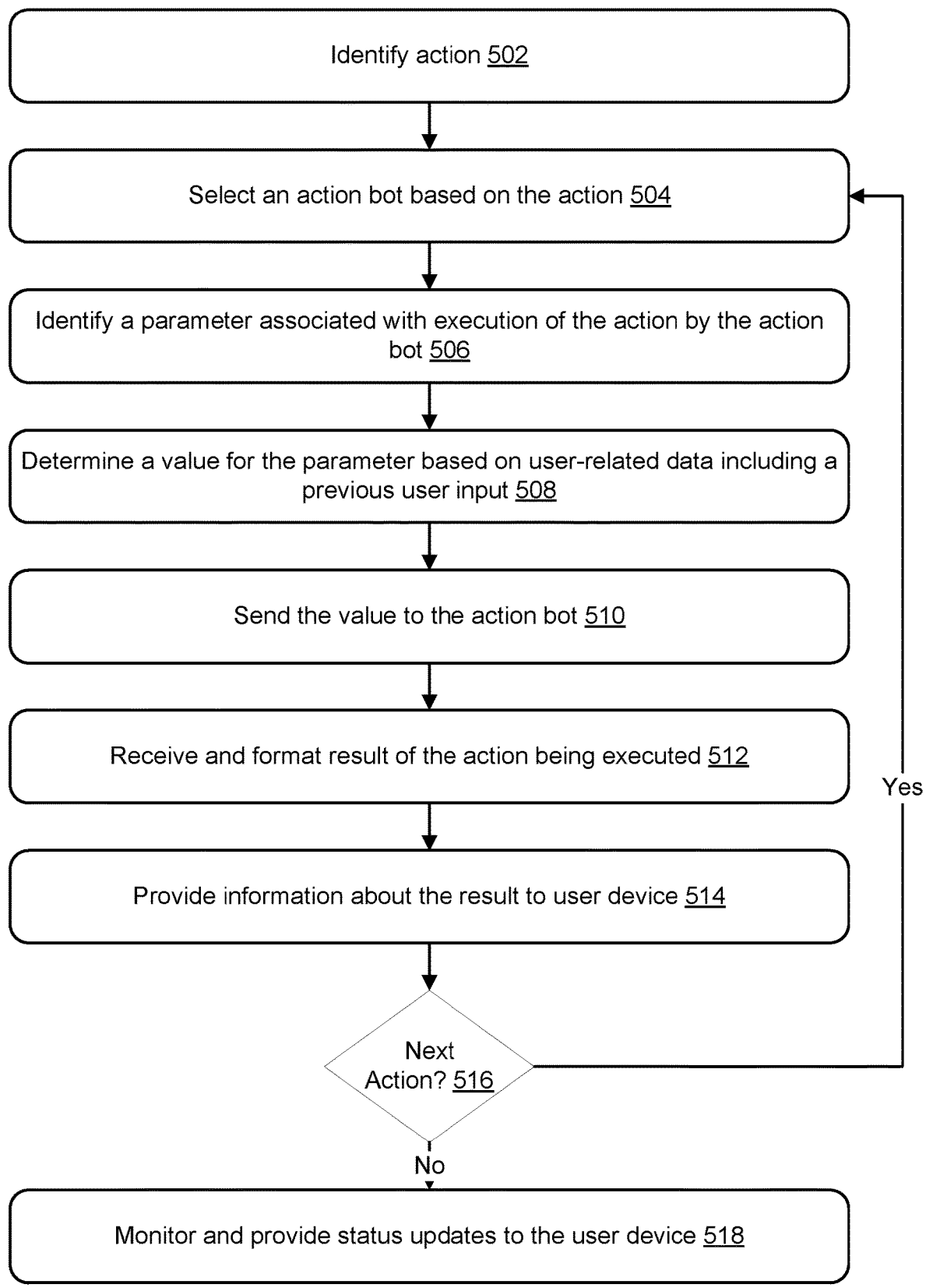
FIG. 5 illustrates an example flow for selecting an action bot and dispatching parameter values for an action to the action bot, according to an embodiment of the present disclosure.
Figure 6:
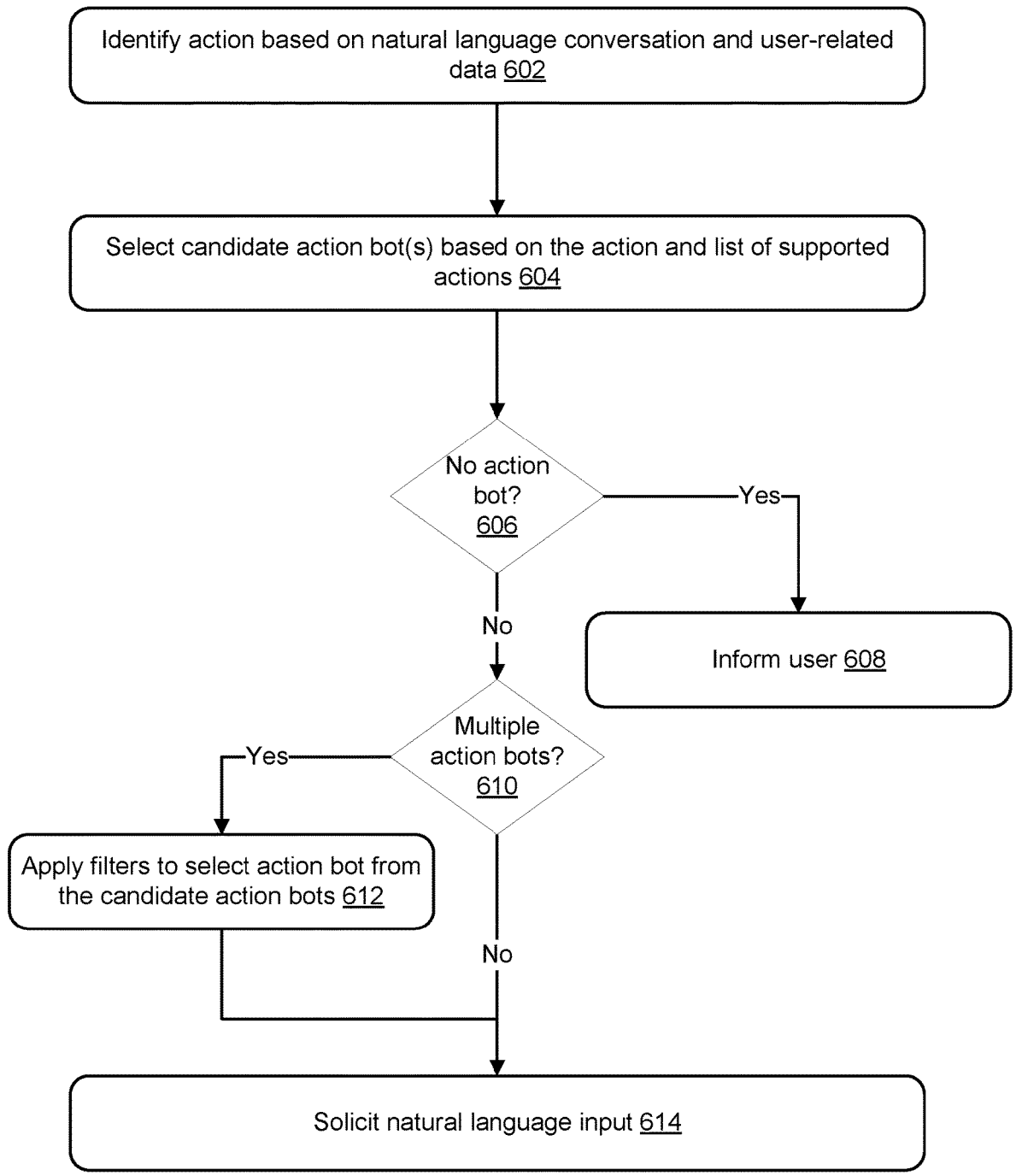
FIG. 6 illustrates an example flow for selection of an action bot by a dispatch bot, according to an embodiment of the present disclosure.
Figure 7:
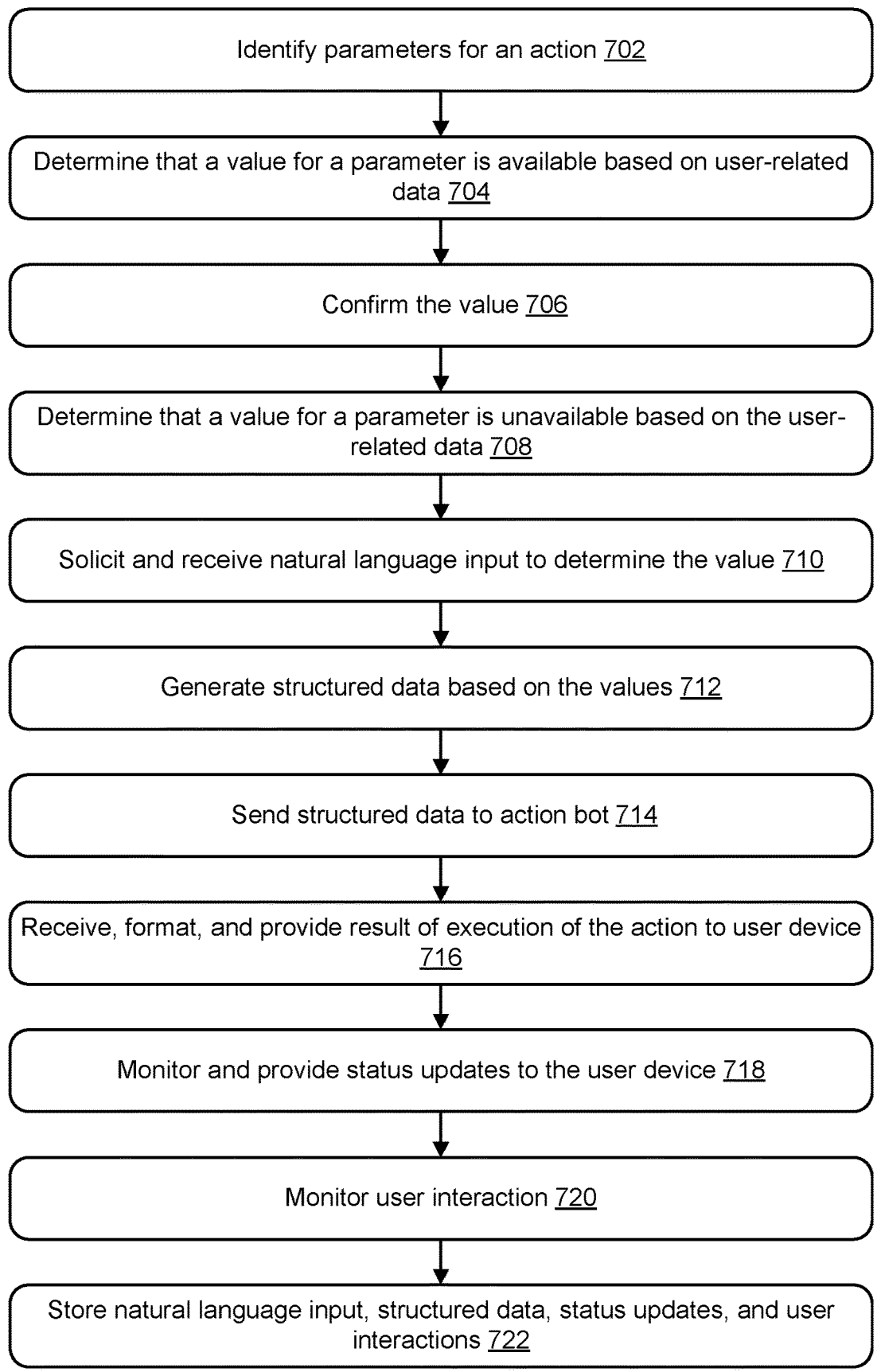
FIG. 7 illustrates an example flow for mediating interactions of a user with an action bot via a dispatch bot, according to an embodiment of the present disclosure.

FIGS. 5-7 illustrate example flows for managing action bots by a dispatch bot. The management may be performed on behalf of a user interfacing with the dispatch bot via a user device. In the example flows, some of the operations may be embodied in, and fully or partially automated by, computing modules executed by one or more processors hosted on computing system. While the operations are illustrated in a particular order, it should be understood that no particular order is necessary and that one or more operations may be omitted, skipped, and/or reordered. In addition, some of the operations may be similar across the example flows. Such similarities are not repeated herein in the interest of clarity of explanation.

FIG. 5 illustrates an example flow for selecting an action bot and dispatching parameter values for an action to the action bot. The example flow may start at operation 502, where the dispatch bot may identify the action. For example, the action may be identified based on natural language conversation provided from the user via the user device and/or user-related data of the user (e.g., user profile, user context, and/or conversation history).

At operation 504, the dispatch bot may select an action bot based on the action. For example, the dispatch bot may access a descriptive list of actions that various action bots support. Various selection techniques may be available. In one example technique, the dispatch bot may match information from the natural language conversation and/or user-related data with the descriptive information. The action bot having the best match may be selected. In another example technique, the action may be predicted (rather than identified as at operation 502) based on the natural language conversation provided from the user via the user device and/or user-related data and a match may be derived based on the prediction. In yet another example technique, the dispatch bot may select the action bot based on a recommendation. The recommendation may be generated based on the natural language conversation and user-related data of other users (e.g., action bot "A" may be recommended given that the user asked for trip planning, where action bot "A" has a high ranking for booking ground transportation as identified based on interactions with the other users).

At operation 506, the dispatch bot may identify a parameter associated with an execution of the action by the action bot. For example, the dispatch bot may access a descriptive list of the parameters for the execution of the action and may identity the parameter from the list.

At operation 508, the dispatch bot may determine a value for the parameter based on the user-related data. For example, if the value is unknown given the user profile, user context, and conversation history, the dispatch bot may solicit the user to define the value through the natural language conversation. On the other hand, if the value is known from any of such user-related data, the dispatch bot may assume the value and may ask the user to confirm or make any update to the value through the natural language input.

At operation 510, the dispatch bot may send the value to the action bot. For example, the dispatch bot may generate structured data based on the defined values. The format of the structured data may depend on bot-related data specific to the action bot. Sending the value may include sending the structured data via an API call or web interface call to the action bot, where this call may also depend on action-bot related data. Operations 506-510 may be repeated across the different parameters. Although illustrated as being sequential, repeating the operations may be performed in an aggregate way (e.g., questions about the unknown values asked and then the values collected in an aggregate way before being sent to the action bot).

At operation 512, the dispatch bot may receive and format a result of the action being executed by the action bot. For example, the dispatch bot may receive the result in response to the value being sent at operation 510. The result may be formatted for presentation to the user according to a natural language format.

At operation 514, the dispatch bot may provide information about the result to the user device. For instance, the information may be provided to a user interface hosted by an application running on the user device. The user interface may present the result according to the natural language format. The user interface may provide the result in a same interface (e.g., window) through which the user has engaged the dispatch bot or through a new interface (e.g., a pop-up window, a notification bar, etc.).

At operation 516, the dispatch bot may determine whether a next action should be executed. For example, the determination may be made based on explicit and/or implicit requests of the user about the next action, egresses from a current action, or a planned/dependent next action within a composite action. If a next action should be executed, operation 504 may be performed again such that operations 504-516 may provide a loop until no next action is determined. Through the loop, commonalties across the parameter values of the actions may be used to minimize the natural language conversation and avoid soliciting the user for redundant information. Although the example flow of FIG. 5 illustrates sequential identification of actions, collection of parameter values, dispatch of actions, and presentation of results, these different aspects of the interactions with the user and with the action bots may be performed in an aggregate manner.

At operation 518, the dispatch bot may monitor and provide status updates about the action and/or the result to the user device. For example, the dispatch bot may receive the status updates from the action bot. The received status updates may be formatted according to the natural language format. The dispatch bot may instruct the user interface to present these status updates according to the natural language format.

FIG. 6 illustrates an example flow for selection of an action bot by the dispatch bot. The example flow may start at operation 602, where the dispatch bot may identify the action based on natural language conversation with the user via the user device and based on user-related data, such as any of the data available from the user profile, user context, and/or conversation history. For example, the dispatch bot may parse the natural language conversation to identify features of the conversation. The dispatch bot may compare these features to ones available from the user-related data of the user and/or other users to predict the action. Additionally or alternatively, the dispatch bot may provide the features and other features from the user-related data of the user to an artificial intelligence model. In turn, the artificial intelligence model may return an identifier of the action.

At operation 604, the dispatch bot may select candidate action bot(s) based on the action and a list of actions supported by action bots. In an example, the dispatch bot may select the candidate action bot(s) based on a match, prediction, and/or recommendation given the features from the natural language conversation and/or user-related data and given the list of supported actions. In another example, the dispatch bot may provide the features to the artificial intelligence model that may return identifiers of the candidate action bot(s) given these features and the list of supported actions. In this case, the artificial intelligence model may identify the best fitting action bot, rather than a list of candidate bots. As such, operations 606-608 may be integral to the operations of the artificial intelligence model.

At operation 606, the dispatch bot may determine whether no candidate action bot was selected. For example, if no candidate action bot is available given the action, no selection may have been made. If so, operation 608 may be performed, where the dispatch bot may inform the user that no action bot is available to support the requested action. Instead, the dispatch bot may recommend to the user another action or an action bot compatible with the other action. The user may accept or reject this recommendation through the natural language conversation.

At operation 610, the dispatch bot may determine whether more than one candidate bots were selected. On one hand, if only one candidate action bot is available, no additional filtering is needed to dispatch the action to the action bot. On the other hand, if multiple candidate bots are selected, some filtering may be needed to down-select to a single action bot. In this case, operation 612 may be performed.

At operation 612, the dispatch bot may apply filters to select an action bot from the candidate action bots. Various types of filters may be used. Some of the filters may be based on user-related data. Other filters may be based on bot-related data. For example, if a user profile indicates a user preference for a particular action bot, that bot may be selected. If none are based on a set of rules permitting the identification of the candidate action bots, the dispatch bot may identify each candidate action bot to the user and ask for a user selection. In yet another example, if a user context indicates a constraint for executing the action, the action bot that best satisfies the constraint may be selected (e.g., the constraint may necessitate a ground vehicle to arrive to the user's location within five minutes). If action bot "A" is capable of deploying the ground vehicle within four minutes while action bot "B" may need six minutes, the action bot "A" may be selected. In a further example, given the conversation history, if a particular action bot necessitates less amount of values to be specified by the user through additional natural language user input relative to another action bot, the particular action bot may be selected. In an additional example, the action bot highest ranked relative to the user and/or against other action bots may be selected. Other types of filters may also be possible based on any or a combination of the user-related data and bot-related data.

In an example, a list of the candidate action bots and the applied filters may be retained for the length of the natural language conversation for various reasons. One example reason may relate to the capability of switching from a currently selected action to another candidate action bot based on a switch event. Specifically, various switch events may occur, where switching from the currently selected action to the other candidate action bot may be beneficial. For example, if during the subsequent portion of the natural language conversation, the user requests to switch action bots, the subsequent portion indicates that the currently selected action bot is unusable, the subsequent portion includes sufficient information usable for the other candidate action bot but insufficient for the currently selected action bot, and/or a constraint hinders the usability of the currently selected action bot, the dispatch bot may switch to the other candidate action bot. Other switch events may be possible. Generally, any event determined from the subsequent portion of the natural language conversation and impacting the filtering selection may be used as a switch event, where the dispatch bot may re-apply the filters given the subsequent portion to re-select another action bot from the list of candidates. In an example, the switch may be transparent to the user, where the dispatch bot may not identify the originally selected action bot and the latest selected action bot to the user nor that the switch occurred. In another example, the switch may be identified to the user and/or a permission for the switch may be requested from the user.

At operation 614, the dispatch bot may solicit natural language input of the user. At this operation, a single bot may have been selected. The dispatch bot may identify the parameters for the execution of the action by the action bot from a list of action parameters. The dispatch bot may use slot filling and assumption to fill values of the parameters from the user-related data, including from previous natural conversation with the dispatch bot about the action or the action bot or about other actions and action bots. The dispatch bot may ask the user to confirm these known values. Any unknown values may be solicited from the user. Confirmation and solicitation of the information may follow a natural language format. For example, the dispatch bot may invoke the artificial intelligence model to generate a set of natural language questions to ask the user given the action, the action bot, the parameters, and the known and unknown values.

FIG. 7 illustrates an example flow for mediating interactions of the user with the selected action bot via the dispatch bot. Mediating the interactions may include collecting user input to parameter values through the user device, dispatching the action to the action bot given the values, and passing the result back to the user device for presentation to the user.

The example flow of FIG. 7 may start at operation 702, where the dispatch bot may identify parameters for the action. For example, the dispatch bot may identify these parameters from a descriptive list of the parameters specific to an execution of the action by the action bot.

At operation 704, the dispatch bot may determine that a first value for a first parameter of the identified parameters may be available based on the user-related data. In this case, the dispatch bot may not solicit the user to specify the value and may, instead, ask for a confirmation, thereby focusing the natural language conversation on unknown parameter values. In an example, the dispatch bot may search the user profile, user context, and conversation history (e.g., the history of the current conversation such as previous statements made during the current conversation, or the history of previous conversations after which the dispatch bot was disengaged). If a match is found for a particular value from the user-related data given the description of the first parameter, the first value may be assumed to be known and may be set to be equal or a function of the particular value.

At operation 706, the dispatch bot may confirm the first value. For example, the dispatch bot may ask the user to confirm the first value or provide an update thereto if needed via a natural language user input. This interaction with the user may follow a set of questions generated by the artificial intelligence model given the action, the action bot, the first parameter, the first value, and the user-related data.

At operation 708, the dispatch bot may determine that a second value for a second parameter of the identified parameters may be unavailable. For example, if no match is found by searching the user-related data given the description of the second parameter, the second value may be assumed to be unavailable.

At operation 710, the dispatch bot may solicit and receive natural language input of the user and may determine the second value based on this input. The solicitation may follow a set of questions generated by the artificial intelligence model given the action, the action bot, the second parameter, the second value, and the user-related data. The received natural language input may specify the second value.

At operation 712, the dispatch bot may generate structured data based on the values, such as the first value, the second value, and other values determined for the remaining parameters of the action through similar operations. The structured data may follow a format specific to interface calls of the action bot. This format may be identified from an identifier of a network location of the action bot. In an example, the dispatch bot may parse the user-related data and any received natural language user input to identify the values. In another example, the dispatch bot may invoke the artificial intelligence model that, in turn, may analyze the user-related data and the received natural language user input to identify the values and generate the structured data.

At operation 714, the dispatch bot may send the structured data to the action bot. For example, the dispatch bot may place an interface call to the action bot, wherein the interface call may include the structured data. By placing the interface call, the dispatch bot may effectively dispatch the action to the action bot on behalf of the user.

At operation 716, the dispatch bot may receive, format, and provide the result of the action execution by the action bot to the user device. For example, in response to the structured data, the dispatch bot may receive information about the result from the action bot. This information may be formatted according to a natural language format for presentation to the user. The format may be generated by the artificial intelligence model given the result, the action, the action bot, and the user-related data. The dispatch bot may send some or all of the information to the user device with instructions to present to the user according to the natural language format.

At operation 718, the dispatch bot may monitor and provide status updates to the user device. For example, the dispatch bot may receive such updates from the action bot over time and may send these updates to the user device for presentation according to a natural language format. Here again, the artificial intelligence model may set the format given the status update, the action, the action bot, and the user-related data.

At operation 720, the dispatch bot may monitor the user interactions through the entire process of collecting information, dispatching the action, and providing status updates (e.g., through any of operation 702-718). This monitoring may allow the dispatch bot to track user selections, user frustrations, natural language user input, generated structured data, history and sequence of the conversation, and/or other data related to the user interactions. The dispatch bot may use the monitored data to provide the user with an egress from the conversation and/or to dynamically shift the conversation.

At operation 722, the dispatch bot may store the natural language user input provided from the user, the generated structured data, the status updates, and information about the monitored user interactions. The stored data may be provided to measure success rates, failure rates, frustration rates, frequency of utilizations, and/or performance measures. The stored data may also be used to further train the artificial intelligence model.

Figure 8:
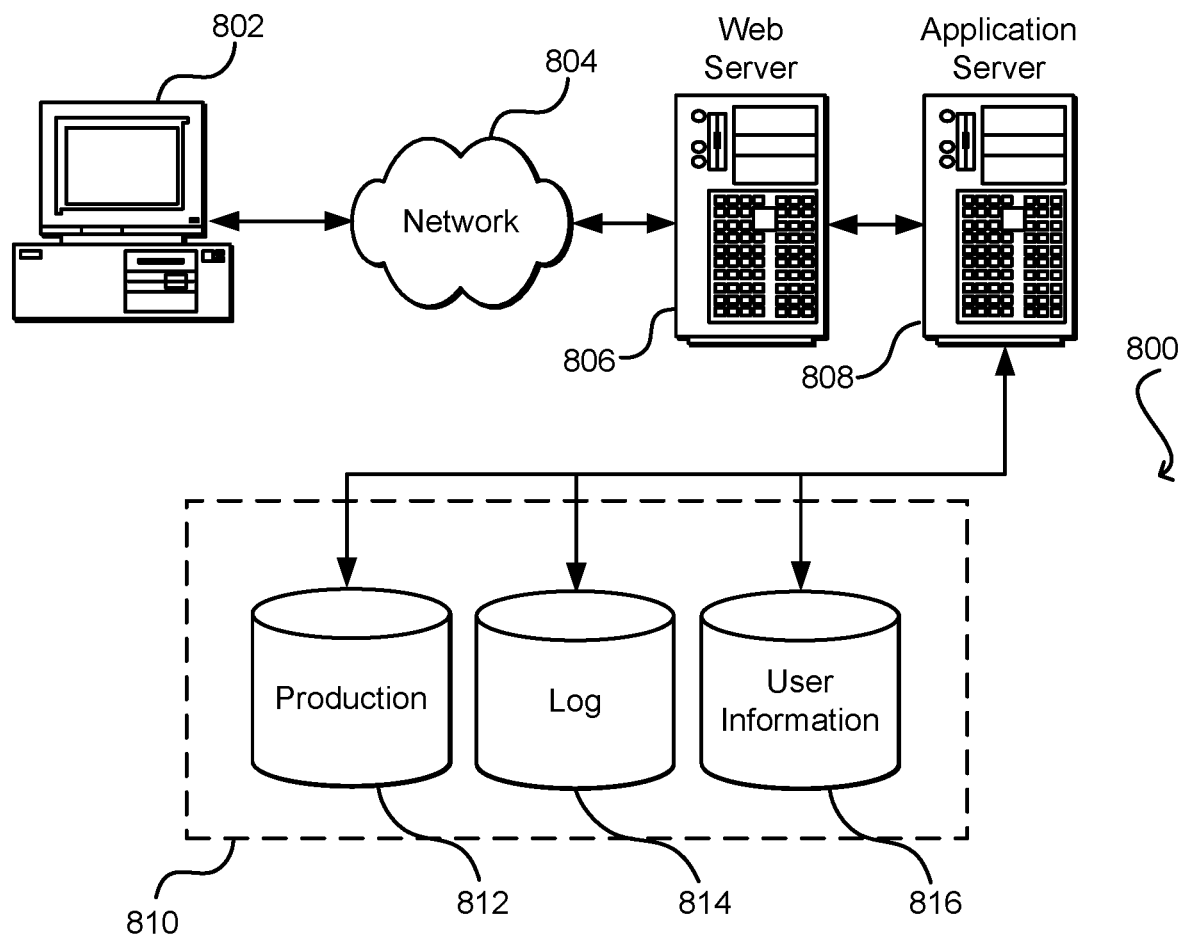
FIG. 8 illustrates aspects of an example environment for implementing aspects of an electronic platform that hosts a dispatch bot, according to an embodiment of the present disclosure.

FIG. 8 illustrates aspects of an example environment 800 for implementing aspects of an electronic platform that hosts a dispatch bot. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases, or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computing system, comprising:
   one or more processors; and
   one or more computer-readable storage media comprising instructions that, upon execution with the one or more processors, cause the computing system to at least run a dispatch bot hosted on the computing system, wherein the dispatch bot is configured to at least:
      identify a first action to be performed for a user based at least in part on a user interaction with the dispatch bot, the user interaction provided from a computing device of the user;
      select a first action bot from a plurality of action bots based at least in part on the first action, the plurality of action bots comprising a second action bot and hosted on the computing system or on another computing system communicatively coupled with the computing system or distributed between the computing system and the other computing system, the first action bot associated with first descriptive information about one or more first actions supported by the first action bot, the second action bot associated with second descriptive information about one or more second actions supported by the second action bot;
      store, in a data store, first user input about the first action, the first user input received from the computing device of the user based at least in part on a communication session between the computing device and the dispatch bot;
      send, to the first action bot, a first value of a first parameter of the first action based at least in part on the first user input;
      identify a second action to be performed for the user based at least in part on second user input, the second user input received from the computing device of the user based at least in part on the communication session, the second action being different from the first action by comprising a different parameter than the first parameter;
      select the second action bot from the plurality of action bots based at least in part the second action;
      determine a correspondence between a second parameter of the second action other than the different parameter and the first parameter of the first action, the correspondence indicating that the first parameter is common to the second action and determined based at least in part on a match between the first descriptive information associated with the first action bot and the second descriptive information associated with the second action bot;
      determine, based at least in part on the correspondence, that the first value of the first parameter of the first action is to be set as a second value of the second parameter of the second action;
      send, to the second action bot, the first value as the second value of the second parameter of the second action; and
      provide, to the computing device associated with the user, a first result of an execution of the first action by the first action bot and a second result of an execution of the second action by the second action bot.

2. The computing system of claim 1, wherein the first user input comprises natural language input based at least in part on a conversation between the dispatch bot and the user, wherein the conversation is about the first action and is facilitated through the computing device of the user, and wherein the dispatch bot is further configured to request the natural language input based at least in part on the first action.

3. The computing system of claim 2, wherein the dispatch bot is further configured to:
   receive, from the computing device, a change of the user to the natural language input; and
   update, based at least in part on the change, the first user input from the data store storing the first user input, wherein the second value of the second parameter is derived from the updated first user input.

4. The computing system of claim 1, wherein the dispatch bot is further configured to populate at least an additional parameter of the first action based at least in part on one or more of a context of the computing device of the user, a user profile of the user, or historical user inputs of the user or of other users to the first action or to other actions supported by one or more of the plurality of action bots.

5. A computer-implemented method, comprising:
- identifying, by a first bot hosted on a first computing system, an action to be performed for a user associated with a computing device, the action identified based at least in part on a user interaction with the first bot, the user interaction provided from the computing device;
- selecting, by the first bot, a second bot from a plurality of bots based at least in part on the action, the second bot hosted on the first computing system or a second computing system;
- determining, by the first bot, a correspondence between the action and a different action of a different bot from the plurality of bots, the correspondence determined based at least in part on descriptive information associated with the second bot and the different bot and indicating a correspondence association between the action and the different action;
- determining, by the first bot based at least in part on a previous user input to the first bot and the correspondence, a parameter value for an execution of the action, the previous user input stored in a data store and indicating the parameter value for the different action of the different bot from the plurality of bots;
- sending, by the first bot, the parameter value to the second bot;
- receiving, by the first bot from the second bot, a result of an execution of the action based at least in part on the parameter value; and
- providing, by the first bot to the computing device associated with the user, information about the result.

6. The computer-implemented method of claim 5, wherein the first bot is a dispatch bot, wherein the second bot is a first action bot, wherein the user interaction comprises user input associated with a conversation with the dispatch bot about the action, and further comprising:
- identifying, by the dispatch bot, a second action to be performed for the user;
- selecting, by the dispatch bot, a second action bot from the plurality of bots based at least in part on the second action;
- sending, by the dispatch bot, a second parameter value for the second action based at least in part on the user input about the action of the first action bot; and
- providing, by the dispatch bot to the computing device associated with the user, information about a result of an execution of the second action by the second action bot based at least in part on the second parameter value.

7. The computer-implemented method of claim 5, wherein the user interaction comprises a natural language conversation with the first bot, wherein the action is identified based at least in part on a parsing of the natural language conversation, a history of the natural language conversation, a history of natural language conversations of the user with the first bot, a profile of the user, or a context of the computing device associated with the user.

8. The computer-implemented method of claim 5, wherein the user interaction does not identify the second bot and comprises natural language input about the action, and wherein the second bot is selected based at least in part on an artificial intelligence model hosted on the first computing system and trained to select the second bot based at least in part on the natural language input.

9. The computer-implemented method of claim 8, wherein the artificial intelligence model is trained based at least in part on natural language inputs of a plurality of users about actions supported by the plurality of bots.

10. The computer-implemented method of claim 5, further comprising:
- determining information about the action based at least in part on content of the user interaction, a history of the content, a history of user interactions of the user with the first bot, a profile of the user, or a context of the computing device associated with the user, wherein the second bot is selected based at least in part on information about the action.

11. The computer-implemented method of claim 10, wherein selecting the second bot comprises at least one of:
- matching the information to information about actions supported by the plurality of bots;
- predicting the action based at least in part on the information and selecting the second bot based at least in part on a capability of the second bot to execute the action; or
- recommending the second bot based at least in part on the information and on user interactions of other users with the first bot.

12. The computer-implemented method of claim 5, wherein selecting the second bot comprises:
- determining that the second bot and a third bot from the plurality of bots support the action; and
- selecting the second bot over the third bot to surface to the computing device associated with the user based at least in part on a filter, wherein the filter comprises at least one of: a ranking of the second bot and the third bot, a ranking of the second bot relative to the user, a user profile, or a constraint associated with performing the action.

13. The computer-implemented method of claim 5, wherein the action is a composite action that comprises a first action and a second action, and further comprising:
- requesting and receiving, by the first bot from the computing device, first user input specific to the first action, second user input specific to the second action, and third user input common to the first action and the second action;
- selecting, by the first bot, the second bot to perform the first action;
- sending, by the first bot to the second bot, one or more parameter values for the first action based at least in part on the first user input and the third user input and independently of the second user input;
- selecting, by the first bot, a third bot to perform the second action; and
- sending, by the first bot to the third bot, one or more parameter values for the second action based at least in part on the second user input and the third user input and independently of the first user input.

14. The computer-implemented method of claim 13, wherein the third bot is selected for the second action based at least in part on a dependency associated with an execution of the first action by the second bot.

15. One or more non-transitory computer-readable storage media comprising instructions that, upon execution with one or more processors, cause a first computing system to run a first bot, wherein running the first bot comprises:
- identifying, by the first bot, an action to be performed for a user of a computing device, the action identified based at least in part on a user interaction with the first bot, the user interaction provided from the computing device;
- selecting, by the first bot, a second bot from a plurality of bots to execute the action, the second bot hosted on the first computing system or a second computing system communicatively coupled with the first computing system;

identifying, by the first bot, a parameter associated with an execution of the action by the second bot;

determining, by the first bot, a correspondence between the action and a different action of a different bot from the plurality of bots, the correspondence determined based at least in part on descriptive information associated with the second bot and the different bot and indicating a correspondence association between the action and the different action;

determining, by the first bot based at least in part on the correspondence, that a value of the parameter is available from a previous user input to the first bot, the previous user input stored in a data store and indicating the value for the different action of the different bot from the plurality of bots;

sending, by the first bot, the value of the parameter to the second bot;

receiving, by the first bot from the second bot, a result of an execution of the action based at least in part on the value; and providing, by the first bot to the computing device associated with the user, information about the result.

16. The one or more non-transitory computer-readable storage media of claim 15, wherein running the first bot further comprises:

identifying, by the first bot, a second parameter associated with the execution of the action by the second bot;

determining, by the first bot, that a value of the second parameter is not available from the previous user input to the first bot;

receiving, by the first bot from the computing device, user input about the value of the second parameter based at least on a request of the first bot for the value of the second parameter; and sending, by the first bot, the value of the second parameter to the second bot.

17. The one or more non-transitory computer-readable storage media of claim 15, wherein the previous user input comprises natural language input to the first bot about the action or another action previously executed by the different bot, wherein the value is sent to the second bot in structured data based at least in part on the natural language input, and wherein providing the information about the result comprises sending natural language output based at least in part on the result.

18. The one or more non-transitory computer-readable storage media of claim 15, wherein running the first bot comprises:

tracking, by the first bot, a status of the action by at least receiving the status from the second bot at time intervals; and providing, by the first bot to the computing device, the status for presentation at the computing device.

19. The one or more non-transitory computer-readable storage media of claim 15, wherein running the first bot comprises:

detecting, by the first bot, an egress associated with performing the action for the user;

storing, by the first bot, user input that belongs to the user interaction and up to the egress;

identifying, by the first bot, a second action to be performed for the user based at least in part on an execution of the second action by a bot; and sending, by the first bot to the bot, one or more values for one more parameters of the second action based at least in part on the user input.

20. The one or more non-transitory computer-readable storage media of claim 15, wherein the user interaction with the first bot comprises a natural language conversation based at least in part on a personality trait of the first bot, and wherein the personality trait is set based at least in part on historical user interactions with the first bot and historical utilizations of action bots.

21. The one or more non-transitory computer-readable storage media of claim 15, wherein the second bot is a second action bot, and wherein selecting the second bot comprises:

selecting a second action bot from a list of candidate action bots based at least in part on a filter, wherein the list identifies the second action bot;

detecting a switch event based at least in part on a subsequent user interaction; and switching the selecting from the different bot to the second bot based at least in part on the switch event.

22. The computing system of claim 1, wherein the execution of the instructions further cause the computing system to:

store the second descriptive information in association with the second action bot, the second descriptive information indicating a supported action and the second parameter of the second action bot, wherein:

selecting the second action bot comprises determining, based at least in part on the second descriptive information, that the second action corresponds to the supported action, and the correspondence between the first parameter and the second parameter is determined based at least in part on the first descriptive information and the second descriptive information indicating that the first parameter and the second parameter use a common set of values.

* * * * *